UNITED STATES PATENT OFFICE.

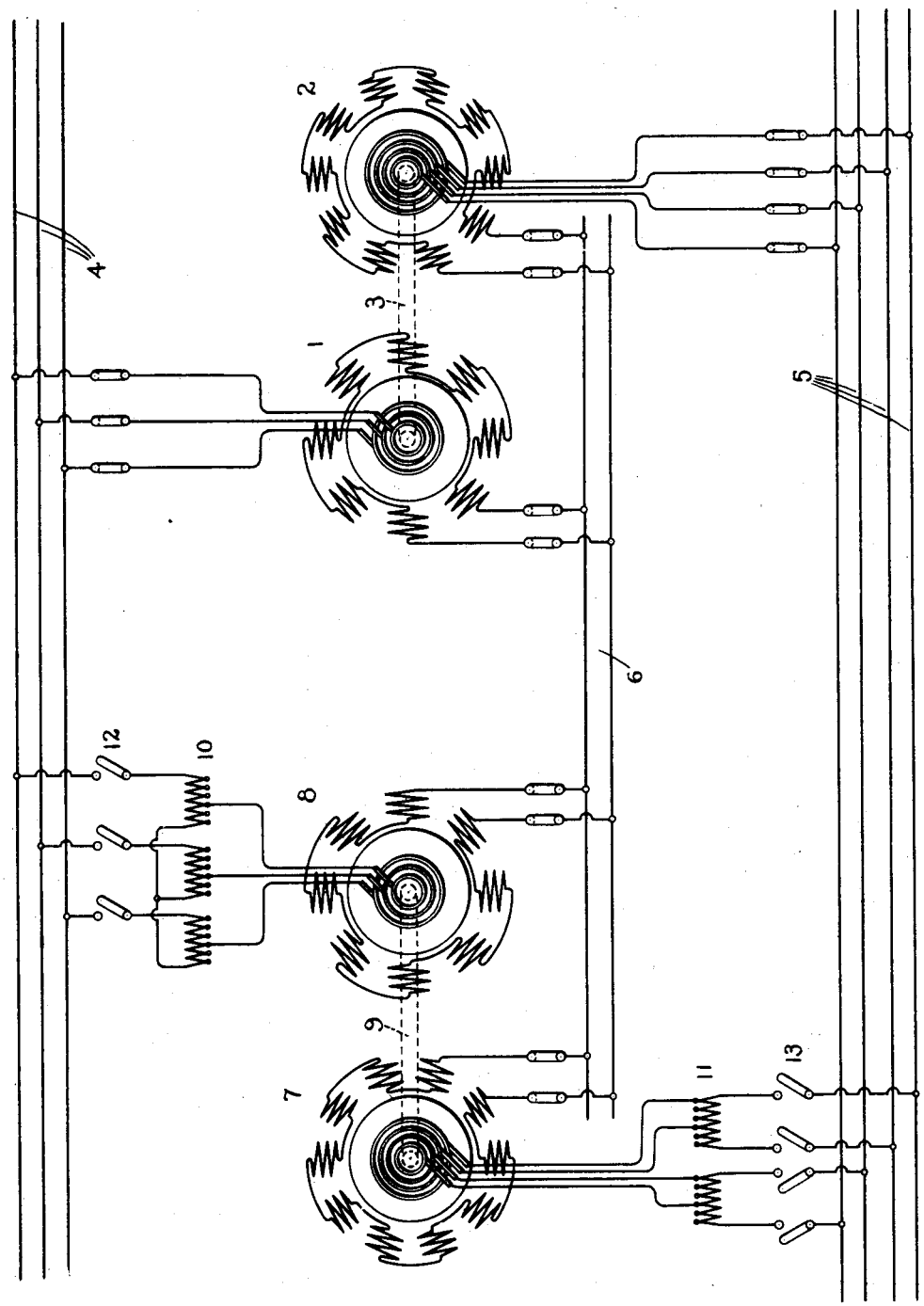

FRANK H. JEANNIN, OF SCHENECTADY, NEW YORK, ASSIGNOR TO GENERAL ELECTRIC COMPANY, A CORPORATION OF NEW YORK.

OPERATING DYNAMO-ELECTRIC MACHINES.

SPECIFICATION forming part of Letters Patent No. 713,307, dated November 11, 1902.

Application filed October 28, 1901. Serial No. 80,177. (No model.)

*To all whom it may concern:*

Be it known that I, FRANK H. JEANNIN, a citizen of the United States, residing at Schenectady, county of Schenectady, State of New York, have invented certain new and useful Improvements in Operating Dynamo-Electric Machines, (Case No. 2,358,) of which the following is a specification.

In synchronizing a set of direct-connected alternating-current dynamo-electric machines with the corresponding members of another similar set or with sets of mains difficulty frequently arises when the machines of the set have different numbers of poles. In such cases when one machine comes into synchronism it is the usual experience to find that the other machine is not in synchronism, and vice versa. In order to avoid troubles of this character, I discard entirely all synchronism-indicating devices and connect the machines directly in circuit through tension-reducing devices, such as compensators or step-down transformers. When a set of machines is thus connected to another set or to sets of mains, current immediately flows to each machine, tending to bring the rotating member of each machine up to synchronism. In case there is a tendency for one machine to come into synchronism before the other, then large currents, which act to prevent synchronism of the first machine, flow to the latter machine until both machines can go into synchronism at the same time. It may, of course, happen that these cross-currents may flow first in one machine and then in the other until synchronism of both is obtained. To prevent excessive currents from flowing, I make use of the tension-reducing devices to which I above referred.

In the drawing I have represented diagrammatically one embodiment of my invention, and in the claims hereto appended I have pointed out what I believe to be the novel features of the invention.

Referring to the drawing, the machines marked 1 and 2 represent the members of a motor-generator set, the machines in this instance being directly connected and the shaft between them represented by the dotted lines 3. The machines are of different numbers of poles, the machine 1 in this instance being shown as an eight-pole machine and the machine 2 as a ten-pole machine. The armature of the machine 1 is provided with a three-phase winding and is connected through suitable leads with the bus-bars 4. The machine 2 may have its armature provided with a winding similar to that of machine 1 or different, as desired. In this instance the armature is supposed to be provided with a quarter-phase winding, the four leads extending therefrom being represented as connected to the quarter-phase bus-bars 5. The field-windings of the two machines may be respectively excited in any desired manner; but I here represent them as both receiving current from a pair of exciter bus-bars supplied with direct current from any suitable source. (Not shown.)

Another motor-generator set is represented by the machines 7 and 8, mechanically connected to a shaft 9. These respective machines are of a construction similar to that of the first-described motor-generator set and like the first set receive their field-exciting current from any suitable source. In this instance they are represented as deriving the current from the same set of exciting-leads 6.

In synchronizing the two motor-generator sets the one with the other the eight-pole member 8 of one set is connected through a compensator 10 to the bus-bars 4, to which the eight-pole member 1 of the other set is connected. In a similar manner the ten-pole machine 7 of one set is connected by a compensator 11 to the bus-bars 5, to which the ten-pole machine 2 of the other set is connected. Suitable switches, represented at 12 and 13, are of course provided, so that the set of machines 7 8 may be connected or disconnected from the respective sets of mains whenever desired.

In synchronizing the two sets of machines the one with the other one set of machines—as, for example, the set 1 2—may be supposed to be already running. The switches 12 13 of the other set are then closed, thus connecting together the corresponding machines of the two sets. The machines 7 8 thus receive current from the respective sets of mains and run up in speed until each machine falls into synchronism. In case one machine drops or tends to drop into synchronism before the other it is immediately dragged out of synchronism, so to speak, by cross-currents flowing in the other machine, and this operation is repeated by one machine or the other until both come into synchronism together. The step-down compensators—to wit, the three-phase compensator 10 and the quarter-phase compensator 11—serve to prevent excessive currents from being drawn from the mains 4 5 while the machines are being synchronized.

It will be observed that in synchronizing in accordance with my invention no synchronism-indicating devices are necessary, the machines merely being connected in circuit through compensators until synchronism is attained, upon which the compensators may be cut out of circuit.

During the operation of synchronizing the field-circuits of the machines 7 and 8 may be left open and after synchronism is attained then closed.

What I claim as new, and desire to secure by Letters Patent of the United States, is—

1. The method of synchronizing sets of direct-connected alternating-current dynamo-electric machines having different numbers of poles, which consists in connecting together the corresponding members of each set through tension-reducing devices, whereby the resulting flow of current operates to bring the machines into synchronism.

2. The method of synchronizing a plurality of sets of direct-connected dynamo-electric machines, the members of each set having different numbers of poles, which consists in causing currents to flow between the corresponding members of the different sets until the respective members of the set or sets to be synchronized come into synchronism simultaneously.

3. The method of synchronizing a set of direct-connected alternating-current dynamo-electric machines the currents of which are normally of different frequency, which consists in connecting both machines to the circuits with which they are to be synchronized, thereby permitting the motor action of the resulting flow of currents to bring the machines into synchronism simultaneously.

In witness whereof I have hereunto set my hand this 25th day of October, 1901.

FRANK H. JEANNIN.

Witnesses:
BENJAMIN B. HULL,
ALEXANDER D. LUNT.